United States Patent
Olszak

(10) Patent No.: US 9,618,320 B2
(45) Date of Patent: Apr. 11, 2017

(54) HETERODYNE SPECTRALLY CONTROLLED INTERFEROMETRY

(71) Applicant: Artur Olszak, Tucson, AZ (US)

(72) Inventor: Artur Olszak, Tucson, AZ (US)

( * ) Notice: Subject to any disclaimer, the term of this patent is extended or adjusted under 35 U.S.C. 154(b) by 0 days.

(21) Appl. No.: 14/834,727

(22) Filed: Aug. 25, 2015

(65) Prior Publication Data
US 2016/0282103 A1    Sep. 29, 2016

Related U.S. Application Data

(63) Continuation of application No. 14/832,052, filed on Aug. 21, 2015.

(60) Provisional application No. 62/044,009, filed on Aug. 29, 2014.

(51) Int. Cl.
*G01B 9/02* (2006.01)

(52) U.S. Cl.
CPC ..... *G01B 9/02007* (2013.01); *G01B 9/02004* (2013.01)

(58) Field of Classification Search
CPC ............ G01B 9/02002; G01B 9/02004; G01B 9/0201
See application file for complete search history.

(56) References Cited

U.S. PATENT DOCUMENTS

| 3,922,092 | A * | 11/1975 | van den Bosch | G01J 3/32 356/332 |
|---|---|---|---|---|
| 6,188,507 | B1 * | 2/2001 | Thomas | G02F 1/33 348/754 |
| 7,519,096 | B2 * | 4/2009 | Bouma | A61B 5/0059 372/102 |
| 8,422,026 | B2 | 4/2013 | Olszak | |
| 8,675,205 | B2 | 3/2014 | Olszak | |
| 8,810,884 | B1 | 8/2014 | Olszak | |
| 2004/0100682 | A1 * | 5/2004 | Fujiwara | G02F 1/0121 359/326 |
| 2004/0190002 | A1 * | 9/2004 | Schulte | G01B 11/2441 356/512 |
| 2010/0183188 | A1 | 7/2010 | Straehle et al. | |

OTHER PUBLICATIONS

Soloviev, Oleg, "Methods and sensors for accurate wavefront measurements," Lomonosov Moscow State University, Jun. 27, 2006. pp. 13, 21-24(online), URL: http://www.bentecservices.com/pdf_files/its_soloviev_20060627.pdf>.

* cited by examiner

*Primary Examiner* — Jonathan Hansen
(74) *Attorney, Agent, or Firm* — Antonio R. Durando

(57) ABSTRACT

Heterodyne interferometry is combined with spectrally-controlled interferometry (SCI) to achieve the advantages of both. Phase shifts produced by SCI produce phase-shifted correlograms suitable for heterodyne interferometric analysis, thereby enabling interferometric measurements with conventional common-path apparatus free of coherence noise and scanning-related errors, and with the precision of conventional heterodyne interferometry. A spectrum-modulating light source suitable for the invention is obtained by combining a rotating spiral grating with a multi-slit grating placed in the front focal plane of a collimating lens that propagates the light toward a blazed diffraction grating. Another exemplary spectrum-modulating light source is obtained by combining a slit spectrometer with an acousto-optic modulator.

14 Claims, 6 Drawing Sheets

HETERODYNE SPECTRALLY CONTROLLED INTERFEROMETRY

RELATED APPLICATIONS

This application is based on and claims the priority of U.S. Provisional Application No. 62/044,009, filed Aug. 29, 2014, and is a CIP application of Ser. No. 14/832,052, filed Aug. 21, 2015, both applications hereby incorporated by reference in their entirety.

BACKGROUND OF THE INVENTION

Field of the Invention

This invention relates in general to the field of interferometry and, in particular, to an approach for performing heterodyne interferometry with conventional apparatus fitted with a spectrally controlled light source.

Description of the Prior Art

Spectrally controlled interferometry ("SCI") is a recently developed interferometric technique that allows implementation of white light interferometry ("WLI") measurement schemes in common-path interferometers. See U.S. Pat. No. 8,422,026, U.S. Pat. No. 8,810,884 and U.S. Pat. No. 8,675,205, all hereby incorporated by reference. WLI is characterized by the absence of coherent noise because of the light's short coherence length, typically on the order of a few micrometers. On the other hand, dust and other contamination, diffraction on rough surfaces, etc. cause reduced measurement accuracy in conventional high-coherence interferometers such as laser interferometers.

Despite these difficulties, laser interferometry is extremely popular and useful because it allows the use of common-path interferometer designs—a particular class of devices in which most of the errors introduced by the optical system cancel out. This allows the manufacture of less expensive and more accurate instruments. High-coherence interferometry is also described as producing a non-localized interference pattern because the interference of beams occurs over a large volume of space, which is an advantage in setting up the measurement apparatus.

WLI is immune to the problems of laser interferometers but requires careful balancing of the optical path difference between the test and reference arm of the interferometer (OPD) so that interference can take place in the measurement space (i.e., within the coherence length of the light). Such arrangements can be complex and prevent the use of common-path interferometers, therefore forfeiting the above-described advantages. WLI produces localized interference because it is visible only in a limited volume around zero OPD.

SCI successfully combines both approaches and provides the advantages of both common-path interferometry and WLI. SCI produces localized interference in an unbalanced OPD interferometer and thus allows, for example, the use of a Fizeau interferometer in WLI mode, thus eliminating the problem of coherent noise. Therefore, one of the major advantages of SCI is that existing instrumentation can be adapted to its modality of operation by replacing only the laser light source with one capable of proper spectral modulation. Different interferometric techniques can be carried out by manipulating only the spectral properties of such light source. See, for example, the time-multiplexed SCI approach described in copending Ser. No. 14/832,052, hereby incorporated by reference.

Heterodyne interferometry is one of the most precise methods of phase measurement. Its precision can be orders of magnitude better than with conventional phase-shifting interferometry, but it requires laser illumination. Therefore, it is susceptible to the same problems of conventional phase-shifting interferometers; that is, coherent noise and multiple interference. This disclosure relates to the implementation of heterodyne interferometry in a SCI setup that enables ultra-precise measurements with temporally incoherent light, thereby overcoming the problems associated with high-coherence interferometry.

SUMMARY OF THE INVENTION

The invention lies in the idea of combining heterodyne interferometry and spectrally-controlled interferometry to achieve the advantages of both. The recognition that phase shifts produced by SCI in the spectral domain yield phase-shifted correlograms suitable for heterodyne interferometric analysis enables an SCI approach suitable for carrying out interferometric measurements with conventional common-path apparatus free of coherence noise, free of scanning-related errors, and with the precision of conventional heterodyne interferometry.

A spectrum-modulating light source suitable for the invention is obtained, for example, by combining a rotating spiral grating with a multi-slit grating placed in the front focal plane of a collimating lens that propagates the light toward a blazed diffraction grating. The light illuminating the multi-slit grating is transmitted to the dispersing grating and reflected back to form shifted spectrum images at the plane of the multi-slit grating, where it is filtered and transmitted back through the spiral grating. By continuously rotating the grating, a corresponding continuous linear change of the phase of the periodic spectral modulation of the source is produced that enables the heterodyne modality of SCI according to the invention.

According to another example of implementation of the invention, a suitable spectrum-modulating light source is obtained by combining a slit spectrometer with an acousto-optic modulator. Collimated light is passed through a dispersive element and the resulting spectrum is focused on a plane coincident with the acousto-optic modulator. The modulated output is then used as the source for SCI measurements.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

Figure 1:
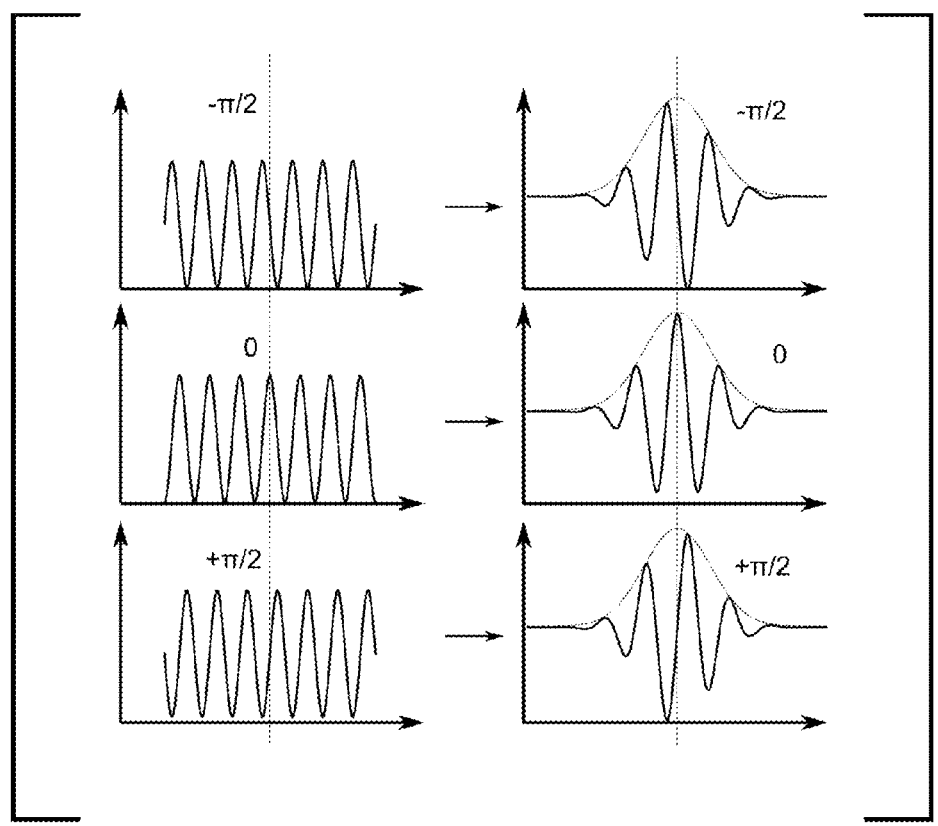
FIG. 1 illustrates the effects of spectral-modulation phase changes on the phase of the resulting interference fringes. The graphs on the left side of the figure show three different modulations of the spectrum with respective phases of $-\pi/2$, 0 and $+\pi/2$. The graphs on the right side illustrate the effects of these phase changes on the corresponding interference fringes, showing that the phase of the fringes follows the changes of phase in the spectral domain. The dotted lines show the respective envelopes of interference fringes.

As used in this disclosure, "white light" is intended to refer to any broadband light of the type used in the art of white-light interferometry, typically having a bandwidth in the order of many nanometers. "Monochromatic" light, on the other hand, is intended to refer to any high-coherence narrowband light capable of producing high-contrast interference fringes within the entire measurement space of the particular apparatus utilizing such light as a source. For the purposes of this disclosure, a source is defined as "temporally coherent" or "coherent" if, at any given time, interference fringes can be detected within the measurement space of the interferometric apparatus used to implement SCI. With reference to light in general, the terms "frequency" and "wavelength" are used alternatively, as commonly done in the art, because of their well known inverse relationship. "Optical path difference" or "OPD" and "time delay" are used alternatively because of their space/time relationship in interferometry. As normally done in the art with reference to interferometric apparatus, "optical path difference" and "OPD" are also used to refer to the difference between the lengths of the optical paths of the test and reference arms of the apparatus. Similarly, "sine" and "cosine," as well as related terms, are used alternatively unless specifically indicated otherwise. The terms "modulate" and "modulation" are used in connection with a light source in the broadest sense to include any alteration of the frequency distribution, amplitude distribution or phase distribution of energy produced by the light source, and to the synthesis by any means of a light signal having a desired frequency, amplitude or phase distribution. With reference to a light source, the term "extended" refers to any spatially incoherent light source, as contrasted to a spatially coherent source, such as a point source generated by a focused laser beam. Finally, the term "interferometry" should be construed broadly and not limited to shape measurements using an imaging interferometer. The same principles can be used to measure changes in distance of an object or measure the thickness of optical elements.

Heterodyne interferometry is typically associated with an interferometric measurement setup where the two interfering beams have slightly different optical frequencies. The resulting interference fringes are not stationary in time, but oscillate at a rate equal to the difference in the optical frequencies of the two beams (referred to in the art as heterodyne frequency). The heterodyne interferometric signal carries information about the optical path difference (OPD) between the beams and can be used for its measurement. The main advantage of such arrangement is that the heterodyne frequency can be isolated with very high fidelity and its phase can be analyzed with a high degree of accuracy. This enables interferometric measurements with a precision orders of magnitude greater than that obtained with conventional phase shifting interferometry (PSI). See F. Zernike, "A Precision Method for Measuring Small Phase Differences," *J. Opt. Soc. Am.* 40:326-328 (1950).

As disclosed in U.S. Pat. No. 8,422,026, one of the properties of SCI is the ability to manipulate the phase of the interference fringes by changing the sinusoidal modulation of the source's spectrum. As illustrated in FIG. 1, changes in the phase of the spectral modulation produce corresponding changes in the phase of the interference fringes. For example, the graphs on the left side of the figure show three different modulations of the spectrum with respective phases $-\pi/2$, 0, and $+\pi/2$. The right side shows the effects of these phase changes on the interference fringes; namely, the phase of the fringes follows the changes of phase in the spectral domain, with corresponding shifts of the modulation envelope (shown by the dotted lines). This property can be used to implement a heterodyne detection scheme in spectrally controlled interferometry, which, as mentioned above, can be advantageous in a number of technical and scientific applications.

In a conventional two-beam heterodyne interferometer, the two beams have slightly different optical frequencies, $v_1$ and $v_2$. The resulting intensity on detector is described generally by the equations below, where for clarity the heterodyne term with frequency $v_1+v_2$ has been omitted because outside the detection range of detectors suitable to practice the invention:

$$I(t) = \int_0^{+\infty} E(v)E^*(v)e^{-2\pi i \tau v}e^{-2\pi i \Delta v t}dv = Ie^{-2\pi i \tau v}e^{-2\pi i \Delta v t} \quad (1)$$

and $$v = c/\lambda. \quad (2)$$

In the particular case of heterodyne illumination, $v=(v_1+v_2)/2$ is the mean optical frequency, $\Delta v=(v_1-v_2)/2$ is the difference in optical frequencies of the two beams, E is the complex amplitude of the light, c is the speed of light, $\lambda$ is its wavelength, $\tau$ is the time delay between the reference and object beams corresponding to the OPD, and * denotes the complex conjugate.

The intensity must be registered by a detector that is fast enough to capture the variations of the signal with time; accordingly, the heterodyne frequency must be chosen to match detector capabilities. The phase of the heterodyne signal is related to the OPD present in the interferometer and, by analyzing it, it is possible to gain information about its value. Equation (1) is the basis of operation of conventional heterodyne interferometry.

Considering now the same apparatus normally used for heterodyne interferometry modified only with a source capable of operation using SCI principles (such as a light with a spectrum that is modulated sinusoidally, for example), U.S. Pat. No. 8,422,026 teaches (in Equation 2, expressed in a different form) that the instantaneous intensity is described by the equation $$I(t) = Ie^{-2\pi i\left(\varphi + \frac{\Delta l}{\lambda}\right)} = Ie^{-2\pi i\bar{\tau}\bar{v}}e^{-2\pi i\varphi} \quad (3)$$

where φ is the normalized phase of the sinusoidal modulation of the source spectrum and Δl is the OPD in the interferometer. Equations (1) and (3) are similar, the only difference being in the last term, which in Equation (1) describes the time-dependent sinusoidal modulation of the signal due to the difference in the optical frequencies of the interfering beams while in Equation (3) it describes the modulation due to the phase of the spectral modulation.

In a conventional phase-shifting interferometer the value of φ in Equation (3) is constant in time (or changing in a controllable way to implement, for instance, phase-stepping algorithms). However, in a setup where the phase φ is constantly varying with time, the effect is functionally identical to that of heterodyne interferometry—that is, the output signal is modulated by a time-dependent cosine function the phase of which depends on the OPD. In particular, assume that φ is a linear function of time, that is $$\varphi = ft \quad (4)$$

where f is the frequency of phase (φ) change. Then Equation (3) becomes $$I(t) = Ie^{-2\pi i\tau\bar{v}}e^{-2\pi ift}, \quad (5)$$

which is identical in form to the basic heterodyne Equation (1).

Based on the foregoing, it is possible to implement a heterodyne detection scheme, with all its advantages, using SCI by introducing a time-varying (preferably, but not necessarily, linear) phase shift in the modulation of the source's spectrum. It is worth noting that such manipulation of the spectrum does not cause any other changes in the fringe distribution in space (other than phase); in particular, the envelope of fringes stays the same. This is an important feature of SCI because any change in the intensity of the output signal not attributed to the heterodyne signal would lower the measurement accuracy. In contrast, in conventional interferometry the change of fringe phase is typically done by altering the OPD between the interfering beams, e.g., by moving the position of the reference surface. This in turn shifts the location of the fringe envelope.

The implementation of SCI-based heterodyning is therefore reduced to the means of introducing a continuously time-varying phase shift in the spectral domain. Two such embodiments of the invention are described herein, it being understood that others are possible within the knowledge of those skilled in art. One embodiment is based on an optical modulation of the source, as described in U.S. Pat. No. 8,422,026, the other is based on an acousto-optic modulator (AOM).

Figure 2:
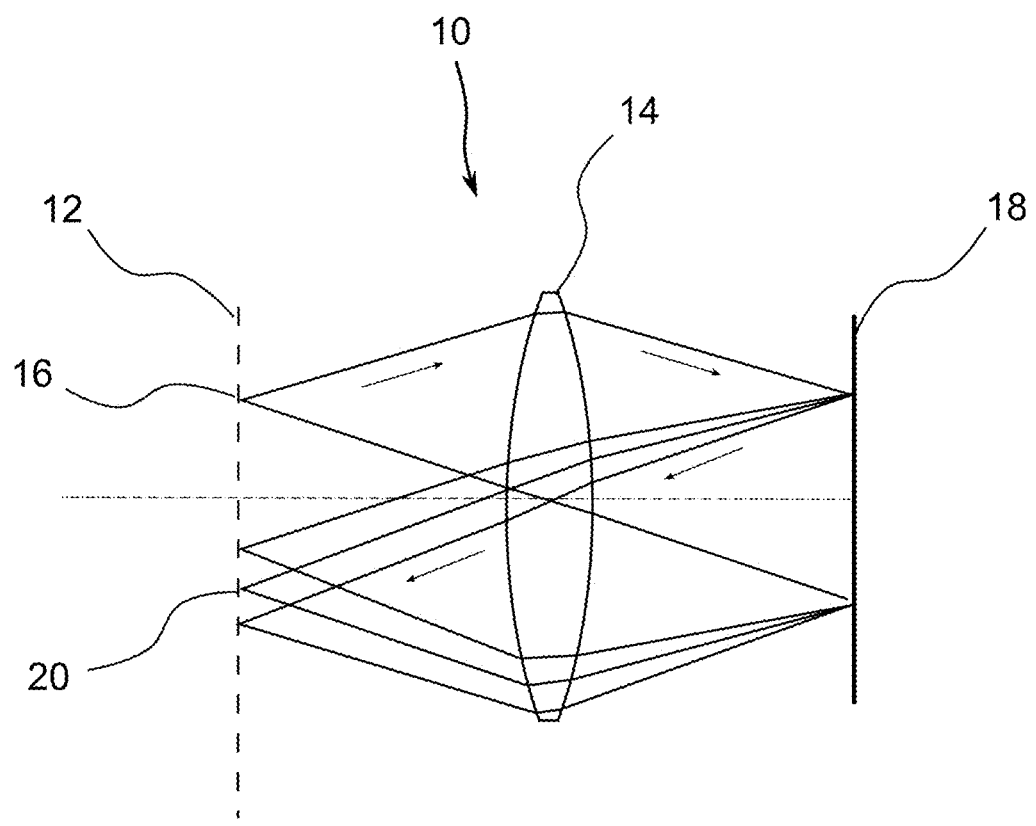
FIG. 2 illustrates schematically a spectrum-modulating source based on a grating that is suitable for practicing heterodyne SCI according to the invention.

Referring to FIG. 2, a spectrally controlled source 10 is shown as described in U.S. Pat. No. 8,810,884, entitled "Light Sources for Spectrally Controlled Interferometry." A periodic element such as a multi-slit grating 12 is placed in the front focal plane of a collimating lens 14 and is illuminated from the left by a broad-band source. Tracing the light path through the system, the external light used to illuminate the grating is identified by reference numeral 16. The transmitted light is collimated by the optical system 14 and dispersed by a dispersing element, such as by a blazed diffraction grating 18. A prism with a reflective back surface can be used for this purpose as well. After diffracting on the grating 18, the collimated light is reflected back towards the lens 14 and into the front focal plane (coinciding with the grating 12), where it forms shifted spectrum images that are filtered by the same multi-slit grating 12. In such a system, the critical element is the multi-slit grating 12, which acts both as a multiple light source and a filtering element in the spectrum plane 20. As taught in the referenced patent, the lateral position of the grating 12 with respect to the direction of propagation of the spectrum defines the phase of spectral modulation and its period defines the distance at which the fringes form in the instrument. Therefore, by manipulating the grating 12, it is possible to control both the phase and the period of the spectral modulation. In particular, by continuously translating the grating 12 in the direction perpendicular to its lines, heterodyne signals can be produced for an SCI-based instrument.

Figure 3:
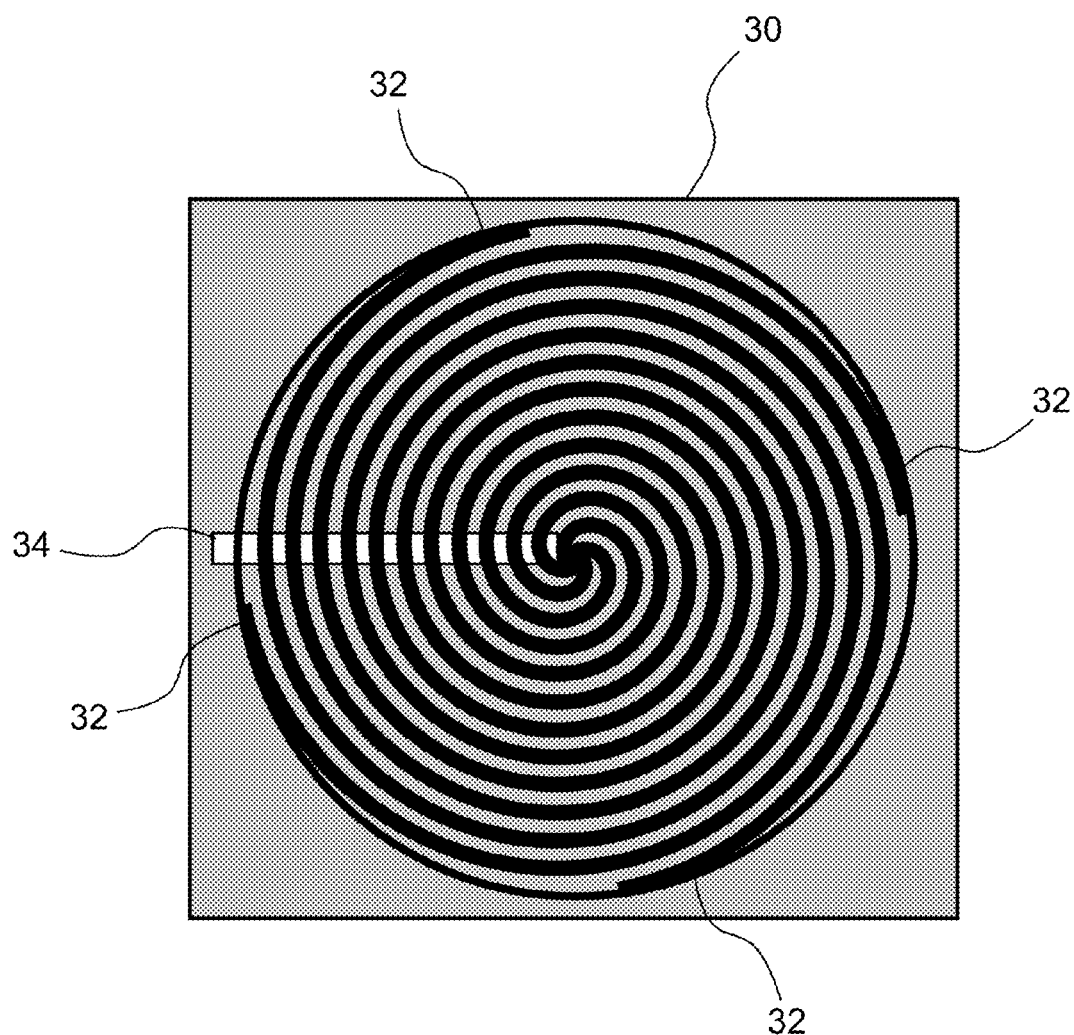
FIG. 3 illustrates a spiral grating used to induce a continuous linear phase change in the spectrum of light produced by the source of FIG. 2.

One way to provide such linear and continuous movement of the multi-slit grating element 12 is shown in FIG. 3. It consists of a circular grating 30 with multiple lines 32 forming spirals. Such grating can be used in the source 10 shown in FIG. 2 such that only a slit 34 corresponding, for example, to the part shown on white background in FIG. 3 (an "exposure window") is used as the multi-slit element 12 of FIG. 2. Considering only the exposure window as the operative structure of the grating, the spiral grating can be regarded as a regular linear grating, as described with reference to the source 10. The spiral grating is then rotated about its center, which causes the line pattern in the exposure window to shift along the radius of the circular grating with a speed proportional to the angular speed of the circular grating and to the shape of the spiral lines. Therefore, by continuously rotating the grating, a corresponding continuous linear movement of the lines in the exposure window can be achieved, thereby producing the desired effect of a continuous linear change of phase of the periodic spectral modulation of the source (hence enabling the heterodyne modality of SCI).

Figure 4:
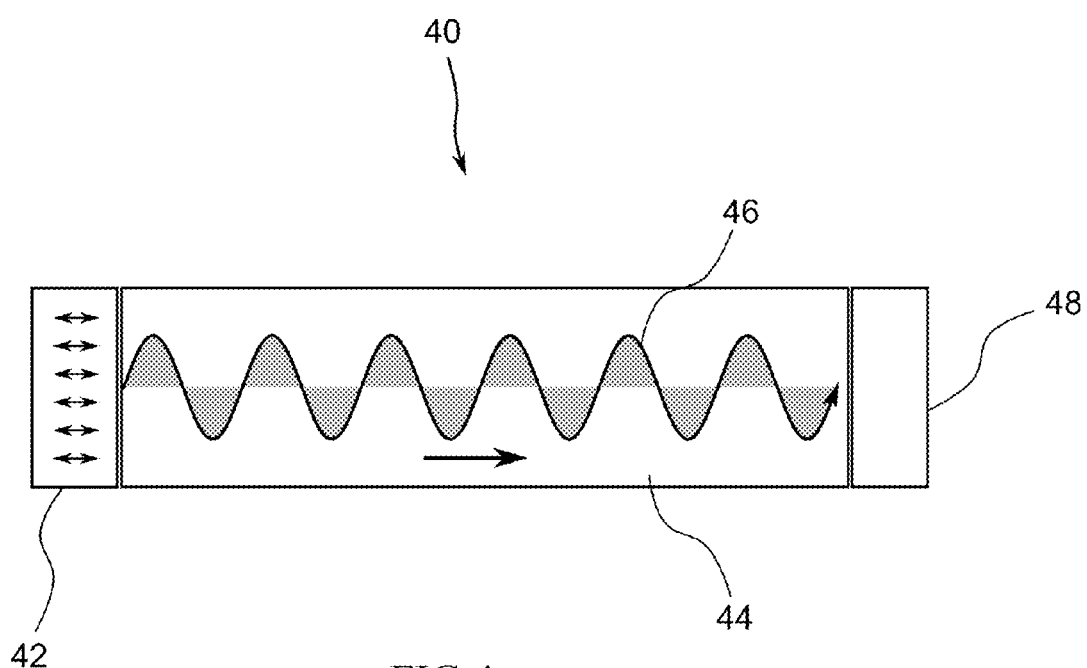
FIG. 4 is a schematic representation of an acousto-optic modulator that is also suitable to practice the invention. A piezo-electric transducer (PZT) is attached to a block of optical medium and excited to mechanically vibrate at a particular frequency. The dimensional changes of the PZT element cause mechanical (acoustic) waves to be injected into the medium and to travel away from the PZT toward an absorber at the far end of the element. The acoustic waves cause changes in the refractive index of the medium forming a running phase grating coincidental with the acoustic waves.

According to another embodiment of the invention, an acousto-optic modulator (AOM) is utilized to produce the continuous linear change of phase of the periodic spectral modulation of the source, as needed for the heterodyne modality of SCI operation. An AOM is a device in which changes in the distribution of its refractive index can be introduced by injecting an acoustic (mechanical) wave into the modulator, as illustrated in FIG. 4. Typically, an AOM 40 consists of an electro-mechanical transducer 42, such as piezo-electric transducer (PZT), attached to an optical medium 44 having an index of refraction that varies with stress applied to the material. The PZT is driven using a sinusoidal electrical signal from a generator and, due to corresponding changes in its shape, it causes acoustic waves 46 to propagate through the optical medium 44 toward an absorber 48 at the far end of the element. The acoustic waves 46 in turn produce a periodic variation of the refractive index that travels through the material with the moving sound waves at the speed of sound. Typically, the medium 44 is a flint glass or a crystal such as tellurium oxide (TIO). Such a device can be used to provide spectral modulation in a source.

Figure 5:
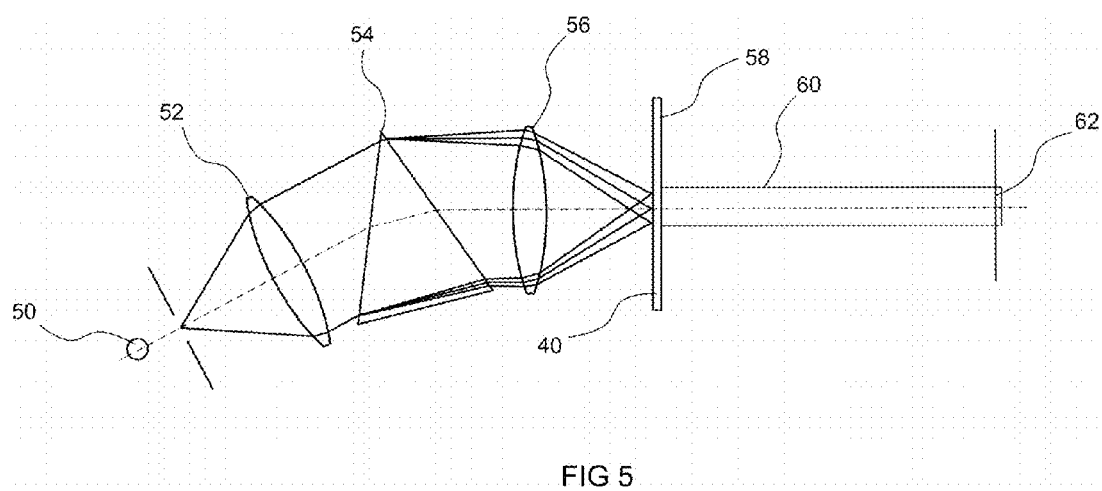
FIG. 5 is a schematic representation of a simple spectrally-controlled light source suitable for the invention based on a slit spectrometer configuration.

Such a spectrally modulated source, based on the combination of a simple slit spectrometer with the acousto-optic modulator described above, is shown in FIG. 5. A light source 50 is positioned in the front focal plane of a collimating lens 52. The collimated light passes through a dispersive element, in this case a prism 54, and is refocused by the focusing lens 56 in the plane 58 of the resulting spectrum. The prism 54 disperses the light and the irradiance detected in the spectrum plane is the result of convolution of the source's spectrum with the width of the light source 50.

The AOM 40 is placed coincident with the spectrum plane 58 and a light pipe 60 is used to recombine the filtered spectrum and deliver it to the output plane 62, which can then be used as the source for SCI.

While practical devices may have more complicated designs than disclosed here, the basis of modulation using an AOM is explained using this simple example. The purpose of the slit spectrometer is to form a spectrum at its exit aperture located in the back focal plane of the focusing lens. The AOM is placed in this plane such that the spectrum is modulated by the continuously moving phase grating formed inside the modulator. After passing through the AOM, the light spectrum is recombined to be delivered to an instrument using a light pipe.

Similar devices have been disclosed in U.S. Pat. No. 8,810,884. However, there are two important differences with respect to the embodiment of FIG. 5. The first difference is that, instead of the amplitude modulation discussed in U.S. Pat. No. 8,422,026 and U.S. Pat. No. 8,810,884, the AOM 40 introduces a phase modulation in the spectrum which, from the functional point of view, produces the same effect of spectral amplitude filtering (i.e., the interference fringes are formed at a predetermined discrete location or locations away from the reference element). This distance is governed by the period of the modulation. The efficiency of such device depends on the amplitude of the phase grating formed by the AOM and it may need to be optimized, but such adjustments do not change the principle and validity of the concept.

The second difference is the introduction of the desired effect of a time-dependent spectral modulation. As the changes in the index of refraction travel with the acoustic wave inside the modulator, so changes are produced in the phase of modulation of the spectrum. As discussed above, such modulation will produce changes in the phase of the interference fringes under a stationary envelope. Typical AOMs operate at frequencies close to 20 MHz and this frequency would be replicated as the heterodyne frequency in the fringe signal.

The embodiments described above illustrate the principle of operation of a heterodyne system in spectrally controlled interferometry. Particular solutions will most likely be more complex and optimized to fit specific problems, but the examples disclosed herein illustrate the key aspects of a heterodyne SCI design.

At the core of the invention is the relationship between the phase of spectral modulation and the phase of the fringes formed in the instrument. A heterodyne measurement scheme can be implemented by simply modulating continuously the phase of the source's spectral distribution. In the most practical implementation, a linear, time dependent modulation is used, but other schemes using a non-linear modulation can be used as well as long as they provide benefits in terms of measurement range, accuracy or other desired characteristics.

Such modulations can also be achieved by means of electronically controllable sources, as described in U.S. Pat. No. 8,422,026 and in copending Ser. No. 14/832,052 relating to time-multiplexed SCI. In a time-multiplexed source, the phase of modulation can be discretely changed in a desired sequence for each detector integration time, such that from a functional point of view the acquired data will look as if it were sinusoidally (or otherwise properly) modulated in time.

Figure 6:
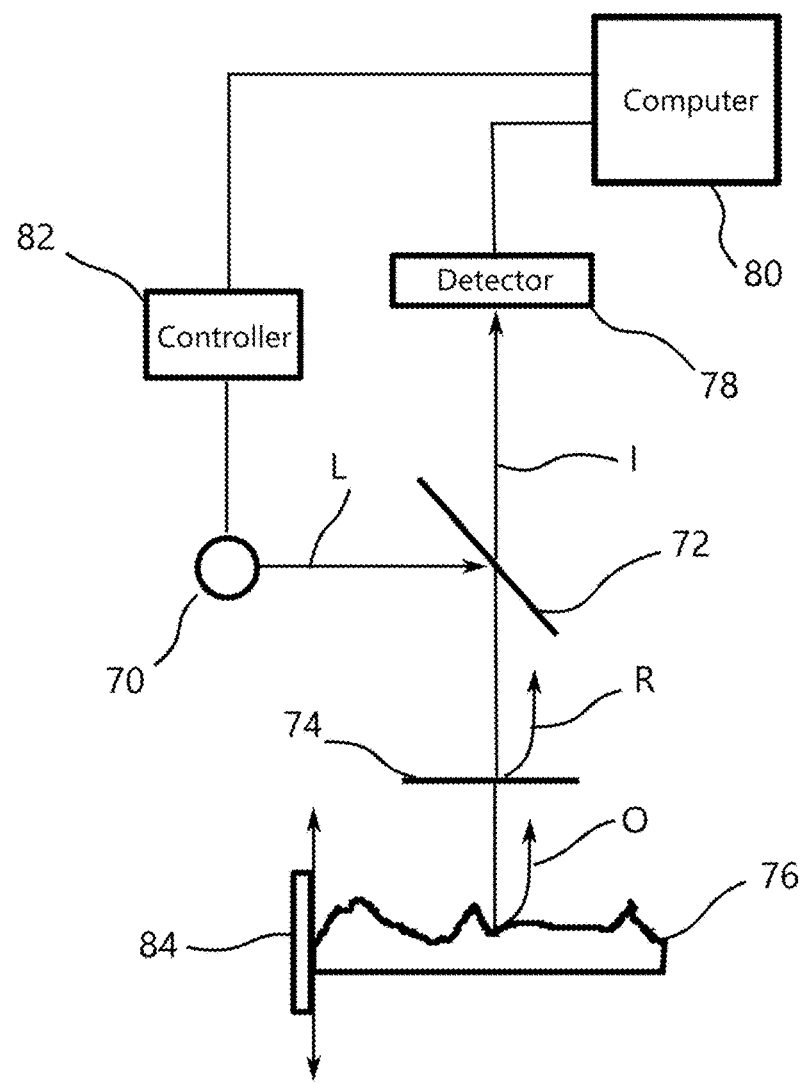
FIG. 6 is a schematic illustration of a conventional Fizeau interferometer adapted to practice heterodyne spectrally-controlled interferometry according to the invention.

FIG. 6 illustrates schematically an example of a Fizeau interferometer adapted to practice heterodyne spectrally controlled interferometry according to the invention. A spectrally modulated source 70, such as described above, produces a light beam L that is reflected by a beam-splitter 72 toward a transparent reference flat 74 and an axially aligned object surface 76. Upon reflection of the light L from each surface, a reference beam R and an object beam O are produced and returned on axis toward the beam-splitter 72. The beams are recombined, thereby producing interference, and are passed back through the beam-splitter to a detector 78 and processor 80 for recording and analysis. According to the invention, the light source 10 is modulated, either stepwise or continuously, as described, by means of an appropriate spectral controller 82 to produce phase shifts in the spectral distribution of the light L and corresponding interference fringes that are formed and recorded for subsequent heterodyne interferometric analysis using conventional tools.

The combination of heterodyne interferometry and SCI makes it possible to carry out measurements free of the coherence noise of conventional PSI, in a common-path configuration free of the OPD balancing requirements of WLI, and with greater precision than either can afford. Moreover, the object O can be measured without the use of the shifting mechanism 84 provided to shift the position of the test object (or the reference mirror) in conventional phase-shift interferometers (such as the Fizeau configuration illustrated in the figure). Therefore, the measurements of the invention are also free of the problems (vibrations, linearity, etc.) normally associated with scanning mechanisms.

Thus, it has been shown that a continuous linear phase shift in the spectral domain of an SCI instrument results in a corresponding continuous change in the phase of the interference fringes under a stationary envelope. This is the principle of heterodyne interferometric measurements, which can therefore be applied also to SCI-based measurements. When coupled with its ability to limit interference to a selected spatial region, the technique of the invention can further improve the range of applications of interferometry in metrology and help solving more challenging measurement problems.

While the invention has been shown and described herein in what is believed to be the most practical and preferred embodiments, it is recognized that departures can be made therefrom within the scope of the invention. For example, the phase shift introduced by modulation to carry out heterodyne SCI has been described with the exemplary introduction of continuous linear phase shifts. However, it is understood that the invention could also be practiced with non-linear and/or discrete phase changes in the modulation of the source's spectrum so long as the corresponding phase shifts in the resulting interferometric fringes are suitable for interferometric analysis. Therefore, the invention is not to be limited to the disclosed details but is to be accorded the full scope of the claims, including any and all equivalents thereof.

The invention claimed is:

1. A method of producing heterodyne interferometric measurement signals for spectrally controlled interferometry with an interferometric apparatus having a predetermined optical path difference, comprising the following steps:

providing a light source having a temporal coherence such that interference-fringe signals are detected within a measurement space of the interferometric apparatus, said light source being capable of spectral modulation to produce a light beam with a varying spectral distribution; and modulating said light source to introduce a time-varying phase shift in said spectral distribution.

2. The method of claim 1, wherein said time-varying phase shift is continuous.

3. The method of claim 1, wherein said time-varying phase shift is linear.

4. The method of claim 1, wherein said modulation is sinusoidal.

5. The method of claim 1, further comprising the step of processing correlogram patterns produced by said spectral distribution with heterodyne interferometric analysis tools.

6. The method of claim 1, wherein said time-varying phase shift is continuous and linear, and the method further comprising the step of processing correlogram patterns produced by said spectral distribution with heterodyne interferometric analysis tools.

7. The method of claim 1, wherein said time-varying phase shift is continuous and sinusoidal, and the method further comprising the step of processing correlogram patterns produced by said spectral distribution with heterodyne interferometric analysis tools.

8. An interferometer for spectrally-controlled heterodyne interferometric measurements, comprising:
a light source having a temporal coherence such that interference-fringe signals are detected within a measurement space of the interferometer, said light source being capable of spectral modulation to produce a varying spectral distribution; and
a spectral controller configured to modulate the light source to introduce a time-varying phase shift in said spectral distribution.

9. The interferometer of claim 8, wherein said time-varying phase shift is continuous.

10. The interferometer of claim 8, wherein said time-varying phase shift is linear.

11. The interferometer of claim 8, wherein said time-varying phase shift is sinusoidal.

12. The interferometer of claim 8, wherein said light source includes
a broad-band source illuminating a periodic element placed in a front focal plane of a collimating lens; and
a dispersing element reflecting back a light transmitted by the periodic element toward the front focal plane of the collimating lens;
wherein the periodic element is a rotating circular grating with multiple spiral lines receiving said light through an exposure window in said rotating circular element.

13. The interferometer of claim 8, wherein said light source includes a slit spectrometer coupled to an acousto-optic modulator.

14. The interferometer of claim 8, wherein said time-varying phase shift is linear and continuous, and said light source includes a slit spectrometer coupled to an acousto-optic modulator.

* * * * *